Nov. 10, 1964 J. CADIOU 3,156,159
METHOD OF AND DEVICE FOR THE REGULATION OF HYDRAULIC MOTORS
Filed July 5, 1961 2 Sheets-Sheet 1
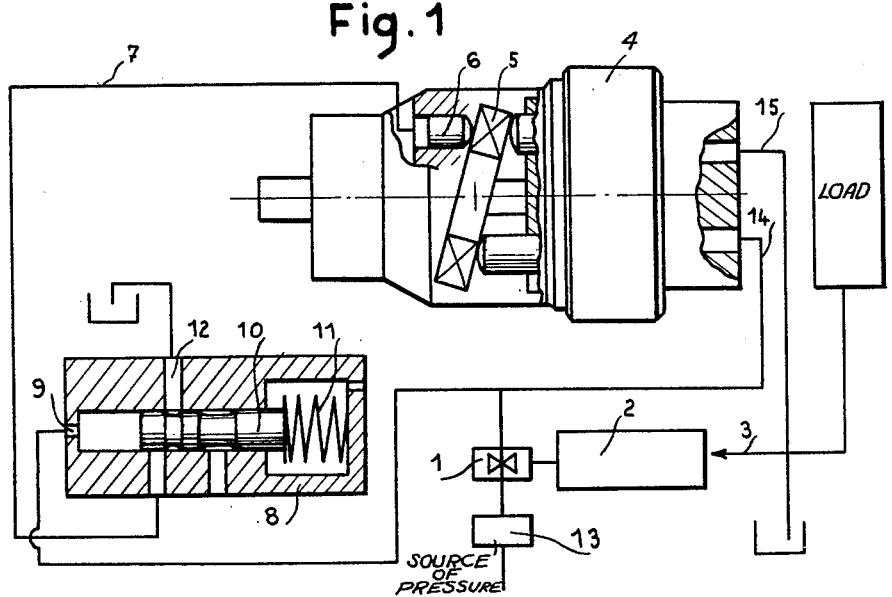
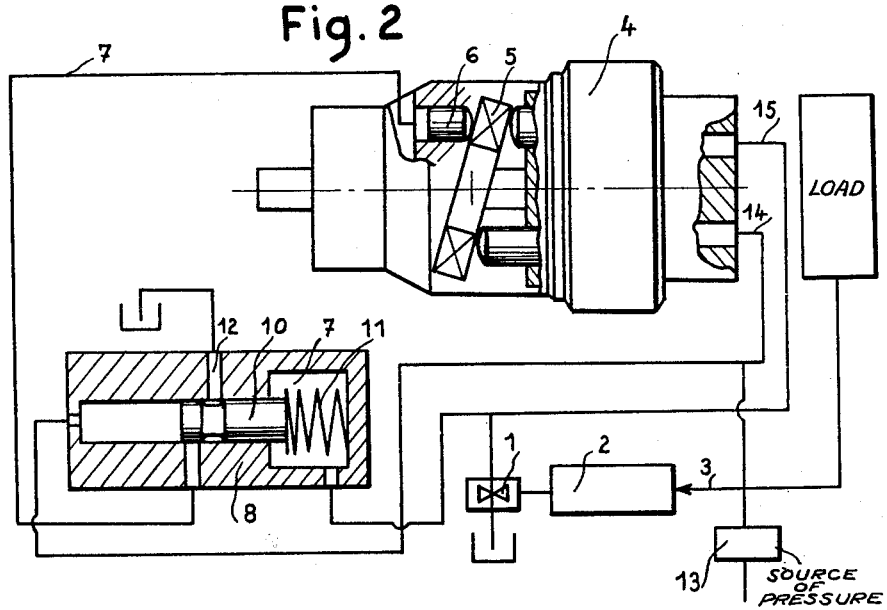
INVENTOR
JEAN CADIOU
ATTORNEYS

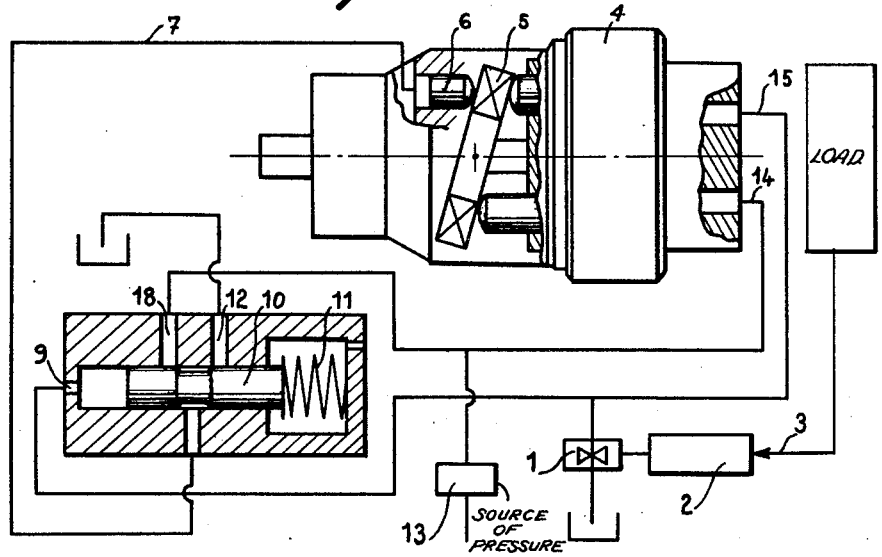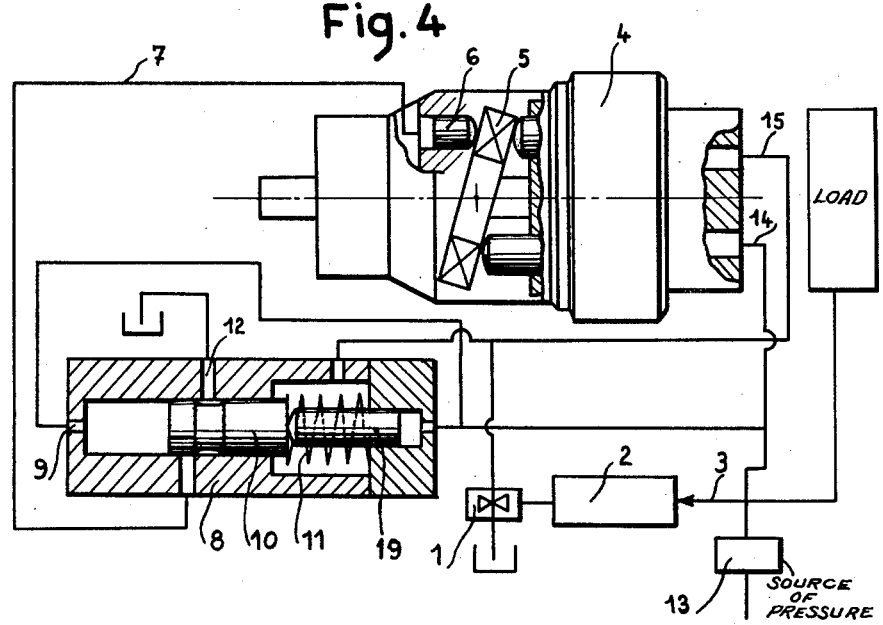

United States Patent Office 3,156,159
Patented Nov. 10, 1964

3,156,159
METHOD OF AND DEVICE FOR THE REGULATION OF HYDRAULIC MOTORS
Jean Cadiou, Paris, France, assignor to Societe Anonyme Andre Citroen, Paris, France, a corporation of France
Filed July 5, 1961, Ser. No. 121,915
Claims priority, application France, July 6, 1960, 832,245, Patent 1,269,749
6 Claims. (Cl. 91—175)

The invention has for its object a method of regulation of hydraulic motors characterized in that it comprises an action on the pressure of the control fluid, followed by an action on an inherent characteristic of the motor, preferably its cylinder capacity.

The action on the pressure provides a practically instantaneous regulation, but introduces a loss of pressure which is eliminated by the method of the invention by subsequently adapting the said characteristic to the desired output by a process of regulation which, alone, would only provide a relatively slow regulation.

The invention has further for its object a reguating device which carries the above method into effect.

In accordance with a preferred form of embodiment, this device is applied to a barrel motor with pistons and a swash plate of variable inclination, and the action on the pressure is obtained by means of a valve controlling the admission or the exhaust, while the said process of regulation is applied by means of a regulator piston acting on the inclination of the swash plate, under the control of the said pressure.

The invention will be better understood by means of the description which follows with reference to the accompanying drawings, in which the same reference numbers have been given to the same parts. In these drawings:

FIG. 1 is a diagram of a regulating device according to the invention, in which the pressure-loss valve controls the admission;

FIG. 2 shows another form of construction in which the said valve controls the exhaust;

FIGS. 3 and 4 show alternative forms of the device of FIG. 2.

It can be seen that the regulating device shown in the drawings comprises a valve 1 controlled by a unit 2, the inlet 3 of which is connected to the load driven by the motor 4, and which may be for example an electric generator.

The unit 2, the construction of which is within the competance of those skilled in the art, is such that it supplies a reduction or increase signal with regard to the opening of the valve, according to the desired regulation. This results in a variation of the pressure of the control fluid of the motor, and therefore of the output of this latter.

The device according to the invention combines with this first method of regulation an action on the swash plate 5 of the motor through the intermediary of the piston 6 actuated by the fluid transmitted through the piping 7 from a side-valve distributor 8.

The distributor receives the high pressure at 9, and comprises a slide-valve 10 displaced by the said pressure in opposition to a calibrated spring 11. Depending on its position, the slide-valve 10 puts the piston 6 into communication, either with the high pressure or with the exhaust, connected at 12.

There is thus obtained a regulation of the inclination of the plate 5 which depends on the value of the pressure which has already been regulated by the valve 1.

The operation of the device will now be examined in detail, in each of the forms of construction described.

In the case of FIG. 1, if for example the resistant torque acting in opposition to the motor diminishes, the unit 2 reduces the opening of the valve 1, so that the high pressure 13 is transmitted to the admission 14 of the motor and to the inlet 9 of the distributor with an increased loss of pressure.

The instantaneous result is on the one hand a reduction of the output of the motor (to the detriment however of a diminution of the power efficiency of the installation) and on the other hand, a displacement of the slide-valve 10 towards the left, until the piping system 7 is put to exhaust. This has the effect of permitting the plate 5 to straighten-up under the action of the resultant of the pressure forces, or of a member (not shown); the cylinder capacity of the motor is therefore reduced, and the device is designed in such manner that this variation in cylinder capacity maintains the power of the motor at the desired value, in spite of the simultaneous elimination of the pressure-drop.

This elimination, which has the object of reestablishing the normal power efficiency of the installation from the moment of the action of the process of relatively slow application of regulation without loss of energy by action on an inherent characteristic of the motor (namely, the cylinder-capacity in the preferred form of embodiment described) is effected by means of members, not shown, the construction of which is within the competance of persons skilled in the art. These members re-establish the normal opening of the valve as soon as the the plate 5 has taken-up its new position of equilibrium.

When the resistant torque increases, a reverse process to that which has just been described has the final effect of inclining the plate 5 in order to increase the cylinder capacity of the motor.

In the alternative form of embodiment shown in FIG. 2, the increase of the pressure-drop by the valve 1 reduces the output of the motor through the intermediary of the exhaust 15. Furthermore, the increase in the exhaust pressure increases the pressure in the chamber 7 of the distributor, which has the effect of displacing the slide-valve 10 towards the left and putting the regulator piston 6 to exhaust, as in the form of construction shown in FIG. 1.

It will be observed that in the devices of FIGS. 1 and 2, the spring 11 should balance the high pressure.

This drawback is eliminated in the alternative form shown in FIG. 3, in which the spring 11 only balances the low pressure, the high pressure being connected to 18 of the distributor.

The increase in the loss of pressure then displaces the slide-valve 10 towards the right and not towards the left, but has the effect however of putting the piston 6 to exhaust, as in the two preceding cases.

The alternative form of FIG. 4 is of the same type as that of FIG. 3, but an auxiliary piston 19 of smaller section than the slide-valve 10 receives the high pressure, so that the spring only balances the low pressure increased by the force applied by the high pressure, over an area equal to the difference between the sections of the slide-valve 10 and the piston 19.

It will of course be understood that many modifications of detail may be made to the device described without departing from the scope of the invention.

I claim:

1. A regulating device for a hydraulic motor of the swash plate type having pistons, a swash plate with a variable inclination, admission and exhaust circuits and a load driven by said hydraulic motor, said regulating device comprising a first stage means disposed on one of said admission and exhaust circuits, means controlled by said load controlling said first stage means for changing the pressure in said admission or exhaust circuit, a second stage means comprising a regulator piston controlling the inclination of said plate and a slide valve distributor controlling said regulator piston responsive to a change of pressure created by said first stage means, whereby said first stage means is restored to its initial position as soon as said swash plate has taken up the inclination which corresponds to the desired output of the motor.

2. Regulating device as claimed in claim 1, wherein the first stage means comprises a valve.

3. A regulating device in accordance with claim 1 wherein said regulator piston is connected to one of said circuits according to the output desired.

4. A regulating device in accordance with claim 1 wherein said slide-valve distributor has a calibrated spring.

5. A regulating device in accordance with claim 4, wherein said admission circuit is connected to said distributor so that said spring balances the low pressure therein.

6. A regulating device in accordance with claim 4 wherein said distributor comprises an auxiliary piston having a smaller cross-sectional area than that of said slide-valve, the high pressure fluid being applied to said auxiliary piston, whereby said spring balances the low pressure increased by the force applied by the high pressure fluid on an area equal to the difference between the cross-sections of said slide-valve and said piston.

References Cited in the file of this patent
UNITED STATES PATENTS

| | | |
|---|---|---|
| 2,683,485 | Harris | July 13, 1954 |
| 2,713,312 | Shaw et al. | July 19, 1955 |
| 2,986,872 | Budzich | June 6, 1961 |